Jan. 22, 1957  W. R. DIEHL  2,778,387
FILLING MACHINE
Filed Jan. 8, 1953  10 Sheets-Sheet 1
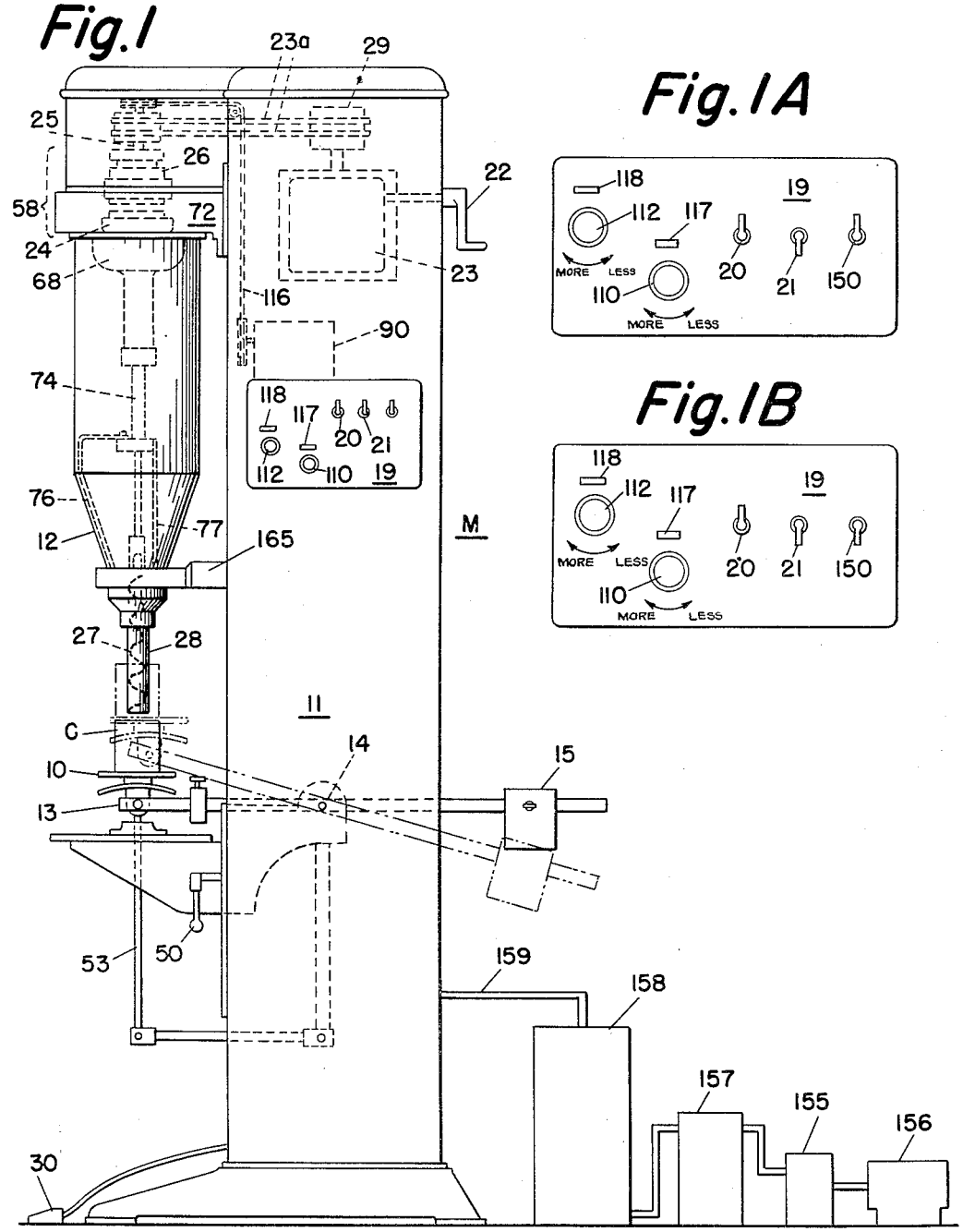
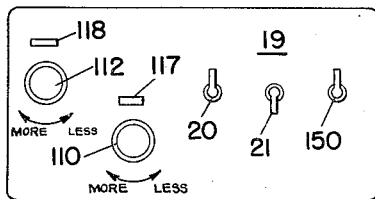
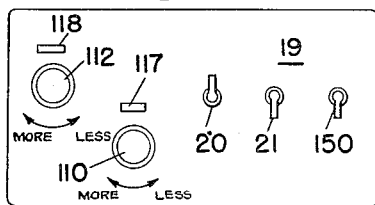
INVENTOR.
WILLIAM ROBERT DIEHL
BY
Woodcock and Phelan
ATTORNEYS Jan. 22, 1957 W. R. DIEHL 2,778,387
FILLING MACHINE
Filed Jan. 8, 1953 10 Sheets-Sheet 4

INVENTOR.
WILLIAM ROBERT DIEHL
BY
Woodcock and Phelan
ATTORNEYS

Jan. 22, 1957   W. R. DIEHL   2,778,387
FILLING MACHINE
Filed Jan. 8, 1953   10 Sheets-Sheet 6

INVENTOR.
WILLIAM ROBERT DIEHL
BY
ATTORNEYS

Jan. 22, 1957  W. R. DIEHL  2,778,387
FILLING MACHINE
Filed Jan. 8, 1953  10 Sheets-Sheet 7
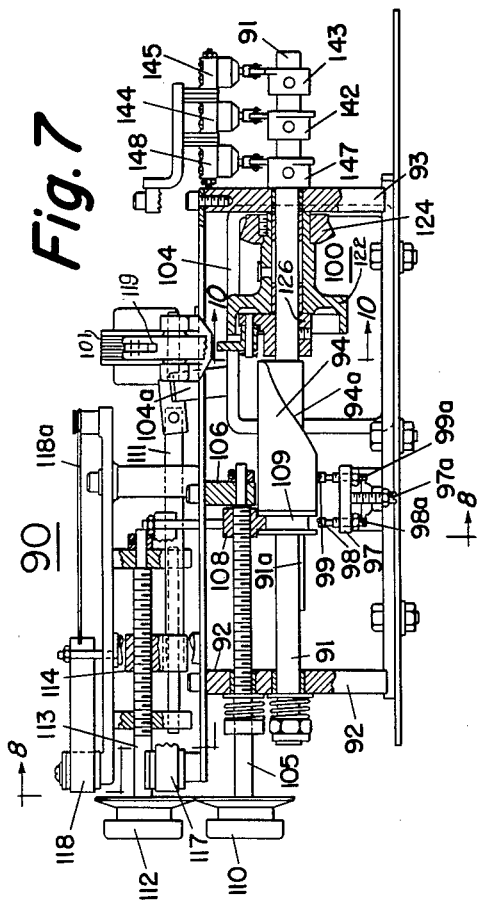
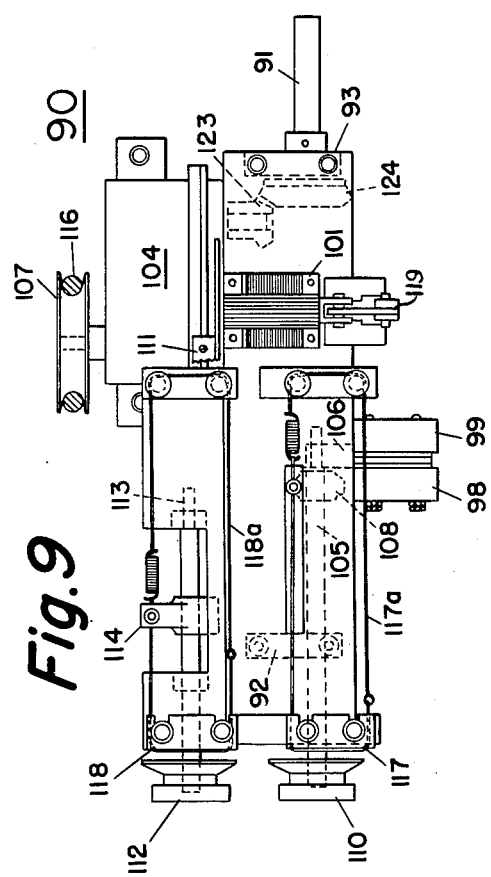
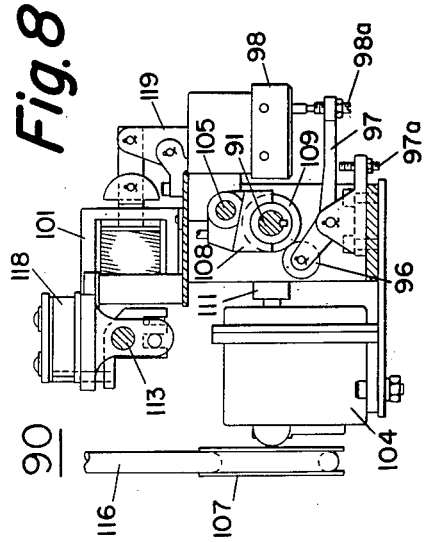
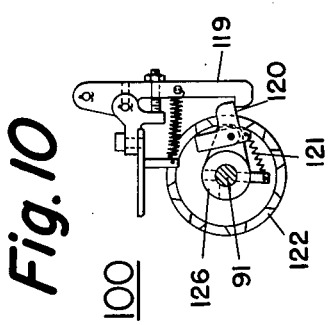
INVENTOR.
WILLIAM ROBERT DIEHL
BY
Woodcock and Phelan
ATTORNEYS Jan. 22, 1957 W. R. DIEHL 2,778,387
FILLING MACHINE
Filed Jan. 8, 1953 10 Sheets-Sheet 8
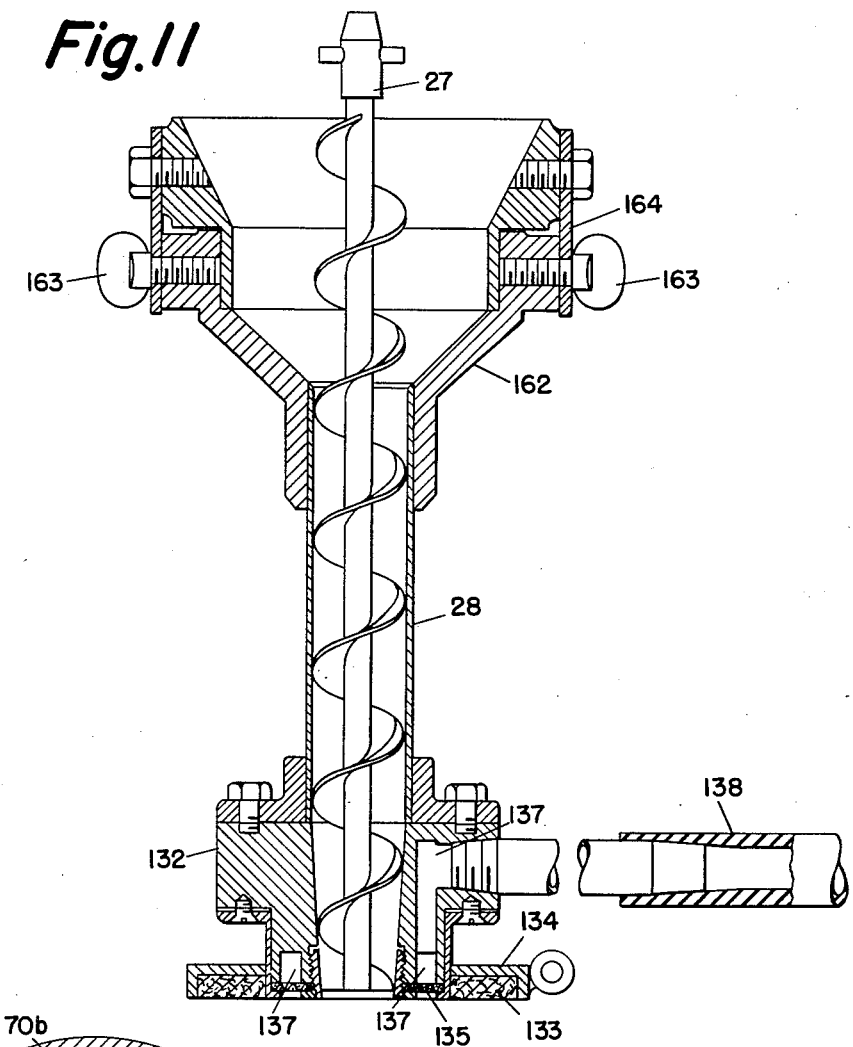
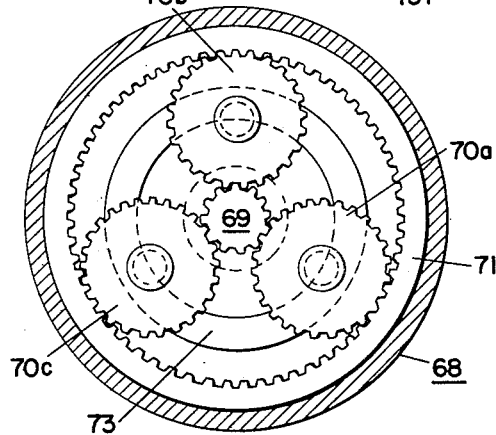
INVENTOR.
WILLIAM ROBERT DIEHL
BY
Woodcock and Phelan
ATTORNEYS

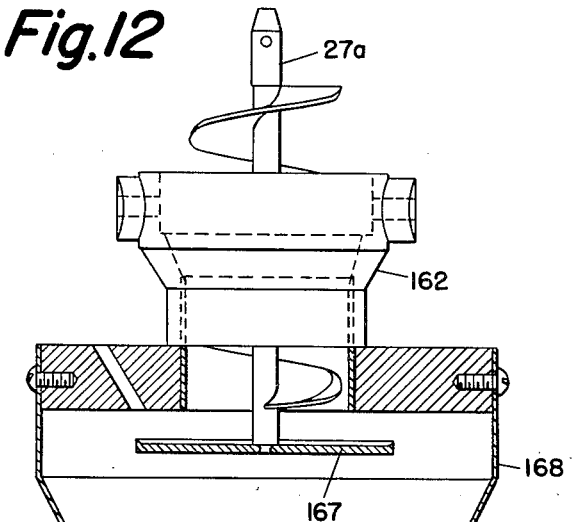
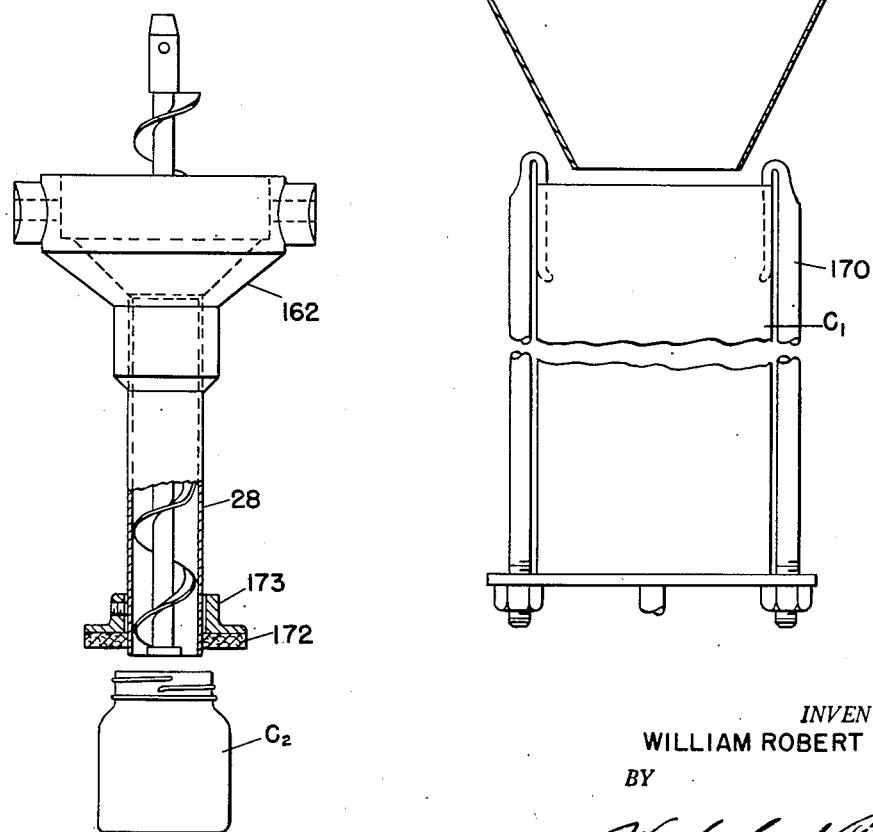

Jan. 22, 1957 W. R. DIEHL 2,778,387
FILLING MACHINE

Filed Jan. 8, 1953 10 Sheets-Sheet 10

INVENTOR.
WILLIAM ROBERT DIEHL
BY
Woodcock and Phelan
ATTORNEYS

United States Patent Office 2,778,387
Patented Jan. 22, 1957

2,778,387
FILLING MACHINE

William Robert Diehl, Plymouth Valley, Norristown, Pa., assignor to Stokes and Smith Company, Philadelphia, Pa., a corporation of Pennsylvania Application January 8, 1953, Serial No. 330,238

22 Claims. (Cl. 141—57)

This invention relates generally to filling machines utilizing systems for filling rigid or flexible containers with pulverized, granular or paste materials and is particularly concerned with systems for filling containers of paper, metal, glass or other appropriate material with such materials as cocoa, talcum, flour, spices, soap powder, milk powder, insecticide, sugar, salt, aluminum paste, soup concentrates, cosmetics and the like, all for brevity herein generically termed "materials." The present invention is an improvement upon the system of filling containers disclosed in Bleam Patent No. 2,330,862 as applied to the filling machine. More particularly, the present invention provides a filling machine of the universal type with components selectively operable for filling containers by any of the methods of pack-filling, weigh-filling, volume-filling or vacuum-filling and utilizes a selective means for determining the method of filling by conditioning the corresponding components.

Heretofore in changing from one method of filling to another, such as from pack-filling or weigh-filling to volume-filling or vacuum-filling, it has been necessary to shut down the machine and utilize the services of a set-up man to make the necessary mechanical changes in the machine so that containers might be filled by the newly selected method. In the present machine, the need for a skilled mechanic or set-up man has been eliminated and the change-over from one method of filling to another may be accomplished without delay by the operator by use of the simple selective mechanism operable by finger-tip control from a central control panel or station of the machine.

The present machine is of the type that automatically feeds a charge of material into a container by means of an auger operable by a motor and there is provided clutch means for operatively connecting and disconnecting the motor with the auger and brake means for selectively preventing rotation of the auger by the motor. Provision has been made for direct and more accurate control of the auger and for avoiding contamination of the various working parts of the filling machine by any of the material that might be spilled during the filling operations. In accomplishing the foregoing, the clutch means, brake means and auger have all been mounted on a common vertical axis on the auger shaft above the filling station of the machine.

Provision also has been made in the present machine of timing means permitting a wide range of filling cycles for volume-filling or vacuum-filling with infinite adjustment within the range, said adjustment being controllable from the aforementioned central control station of the machine and without the necessity of shutting down the machine.

The invention further resides in the systems and the features of construction and arrangement hereinafter described and claimed and for a more detailed disclosure of the invention and for further objects and advantages thereof, reference may be had to the following description taken in conjunction with the accompanying drawings in which:

Fig. 1 is a side elevation of a complete universal filling machine;

Fig. 1A is a view of the control panel of the machine shown in Fig. 1 with the selective means set for filling containers by the method of volume-filling;

Fig. 1B is a view of the control panel of the machine shown in Fig. 1 with the selective means set for filling containers by the method of vacuum-filling;

Fig. 3A is a plan view of the planetary gearing shown in Figs. 1 and 3;

Fig. 7 is a detailed side elevation partly in section of the timing mechanism shown in dotted lines in Figs. 1 and 3;

Fig. 8 is a sectional view taken along the lines 8—8 of Fi.g 7;

Fig. 9 is a top plan view of the timing mechanism of Fig. 7 with some parts omitted;

Fig. 10 is a sectional view of the one revolution clutch taken along the lines 10—10 in Fig. 7;

Fig. 11 is a detail view partly in section of the filling head shown in Fig. 3; and Figs. 12–15 are detail views partly in section showing other modifications of filling heads particularly suited for the various methods of filling to be performed by the universal filling machine of Fig. 1.

Figure 2:
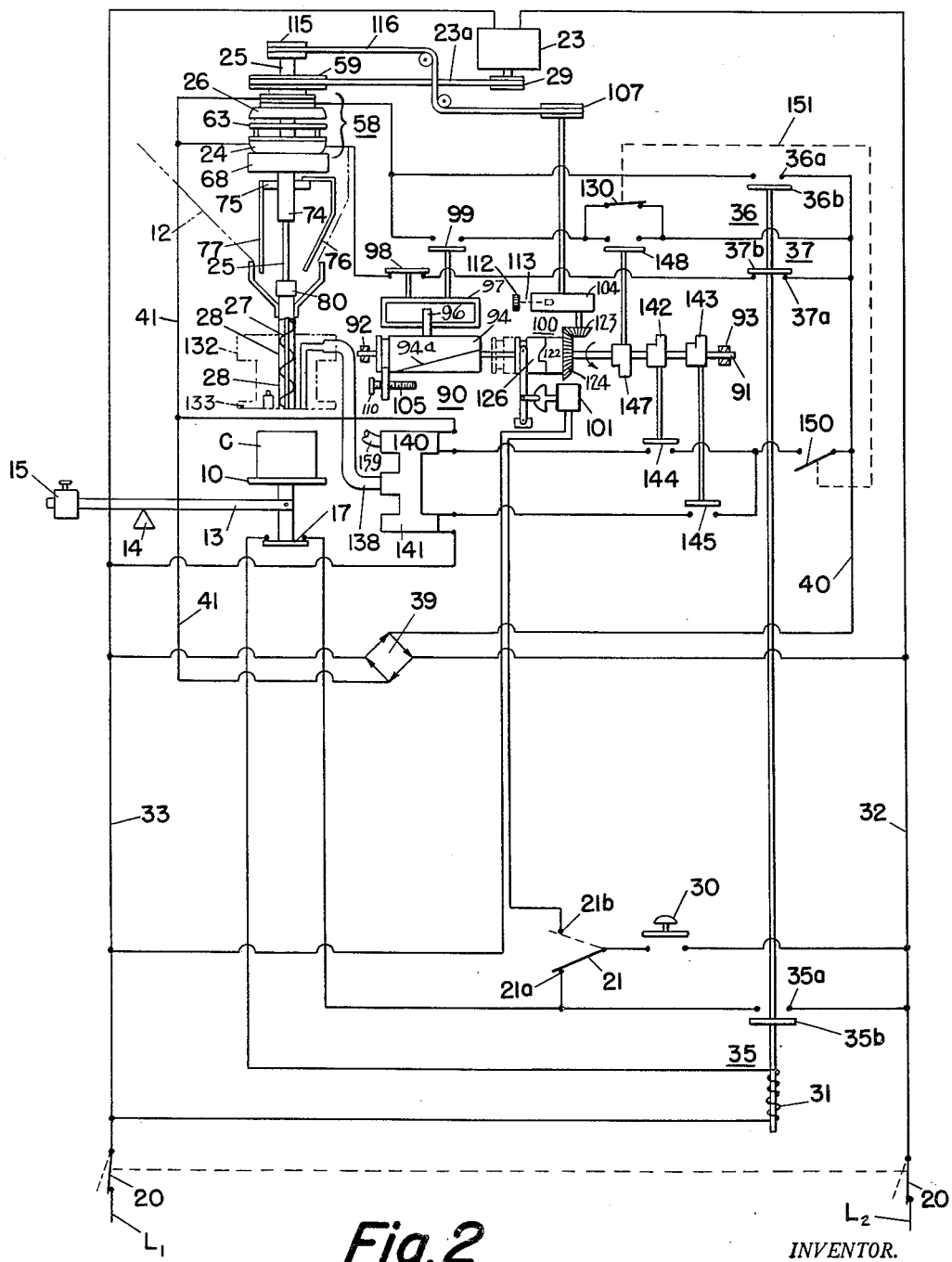
Fig. 2 is a diagrammatic view showing the electric wiring circuit of the machine with various components of the filling machine shown in Fig. 1 associated therewith.

Referring to Fig. 1, the universal filling machine M, as shown, has been set by the operator for filling containers by the method of weigh-filling. The operator places a container C upon the scale pan 10 of scale mechanism 11 which is disposed beneath the open discharge end of the hopper 12, the latter being supplied with the material to be introduced into the container C as by way of supply pipe 12a, Fig. 5. The scale beam 13, Fig. 1, is shown in the form of a lever of the first class and is pivoted about a fulcrum 14. The scale pan 10 is disposed at one end of the scale beam 13 and a counterweight 15 is disposed on the opposite end of the scale beam 13 at the opposite side of fulcrum 14 from the scale pan 10, the counterweight being adjustable along scale beam 13 depending upon the weight of the material to be deposited in the container C. The scale beam 13, preferably, is set in an approximately horizontal position so that a relatively short movement of the beam and pan, for example, about 1/8″ downward movement will actuate a cut-off switch 17, Fig. 2, to stop the flow of material from the hopper 12 into the container. The upward movement of the end of scale beam 13 carrying the scale pan 10 and container C is limited by means of an adjustable mechanical stop 18, Figs. 4 and 6. The counterweight 15 is set in a position on beam 13 to balance a total weight comprising the weight of a container C, the scale pan 10 and also a weight equivalent to the predetermined amount of material to be filled into the container C.

As shown in Figs. 1 and 2, line switch 20 located at a central control station or panel 19 has been moved to closed position, thus connecting the circuit of the machine M with the source of power that may be provided from any suitable source, $L_1$, $L_2$ for example, 110 volts, 60 cycles. A selector means or switch 21, also at control station 19, has been moved to a position for engagement with a contact 21a to condition the various components of the filling machine for filling the container C by the method of weigh-filling. By closing the line switch 20, power is applied to the electric drive motor 23 and to the electromagnetic brake means 24 which is energized and holds the auger shaft 25 in a stationary position. As later will be described more in detail, the auger shaft 25 has integral therewith and located axially thereof a friction clutch 26 electromagnetically operated to control the number of revolutions or turns of the auger shaft 25 which in turn carries an auger 27 for feeding the material into the container C. The auger shaft 25 is driven from a suitable source of power such as electric drive motor 23 having a variable pitch pulley 29 for varying the speed of the auger shaft 25. The speed of the auger shaft 25 is varied to suit the particular flow characteristics of the powders or other materials to be placed in containers. For example, less dense materials such as powders that have a tendency to cause dusty filling operations preferably are fed into the container at a relatively low speed of the auger, for example, at about 500 R. P. M. On the other hand, materials of higher density and which do not create to any considerable extent a dust problem may be fed into containers at a higher speed, for example, at a speed in the order of 1000 R. P. M. of the auger. A further reason for using a low or slow speed auger is that some of the powdered materials have a tendency to slip on the auger and thus cause a non-uniform flow of the material into the container if the auger were driven at high speeds.

With line switch 20 in a closed position, motor 23 is energized and runs in an unloaded condition preparatory to driving the auger shaft 25 through belt connection 23a for a filling operation upon energization of clutch 26. To initiate a filling cycle of the machine M for filling a container by the method of weigh-filling, the operator momentarily depresses a switch means indicated in Figs. 1 and 2 as a foot switch 30 which completes a circuit from one side of the line at conductor 32, Fig. 2, through the contacts of the foot switch 30 through contact 21a of selector means 21 through the normally closed scale limit switch 17 and through the relay holding coil 31 to the opposite side of the line at conductor 33. Upon energization of relay 31, normally open contacts 35a, 35b of normally open switch 35 are closed, thus completing a circuit from conductor 32 through switch 35 and normally closed switch 17 through relay 31 to the opposite side of the line at conductor 33. Accordingly, when foot switch 30 is released, relay 31 remains energized and continues to remain energized until the normally closed switch 17 is opened upon completion of the filling cycle, thereby breaking the circuit through the relay 31. Upon energization of relay 31 in addition to closing contacts of normally open switch 35, the contacts 36a, 36b of normally open switch 36 are closed, thereby completing an electrical circuit to the coil of clutch 26. At the same time, the contacts 37a and 37b of normally closed switch 37 are opened, thus interrupting the electrical circuit to the electromagnetic brake 24.

As may be seen in Fig. 2, the voltage applied to brake 24 and clutch 26 is derived from a D. C. source illustrated as a rectifier unit 39 across the input terminals of which are connected conductors 32 and 33 and across the output terminals of which are connected conductors 40 and 41. As shown in Fig. 2, switch 36 is in series with clutch 26 and switch 37 is in series with brake 24. It is to be understood that the power source indicated at $L_1$, $L_2$ may be either an A. C. or D. C. source and that the drive motor 23, the clutch 26 and the brake 24 may also be of either the A. C. or D. C. type. Thus, while a preferred arrangement has been illustrated, it will be seen in Fig. 2 that if the power source $L_1$, $L_2$ is D. C., the rectifier unit 39 may be eliminated. Similarly, the unit 39 may be eliminated if the motor 23, clutch 26 and brake 24 are of the A. C. type, and if $L_1$, $L_2$ is supplied from an alternating current source. It is further to be understood that drive motor 23 may be supplied from a separate source of power and at a voltage differing from that of line $L_1$, $L_2$.

Upon deenergization of electromagnetic brake 24 and energization of friction clutch 26, the drive motor 23 will be mechanically connected to the auger shaft 25, thereby causing it to rotate and initiate the filling of material by the auger 27 into the container C. The auger shaft 25 continues to rotate until a predetermined quantity of the material has been deposited in container C at which time the scale pan 10 will be caused to be depressed to a predetermined position due to the additional weight of the material deposited in the container thereby opening the scale limit switch 17 and breaking the electrical circuit through relay coil 31. Upon deenergization of relay coil 31, the contacts of switch 37 in circuit with the brake are closed and the contacts of switch 36 in circuit with the clutch are opened whereupon the auger shaft 25 is disconnected mechanically from drive motor 23 and the brake 24 is energized preventing further rotation of auger shaft 25. Upon stopping of auger shaft 25 the material is at once prevented from further flowing into container C. The filled container C is then removed from the scale pan 10 and the operation repeated as above for additional containers.

Before describing the methods of utilizing the filling machine M for filling containers by the methods of pack-filling, volume-filling and vacuum-filling, reference will be had to Figs. 3–6 for a more detailed description of the machine.

Figure 4:
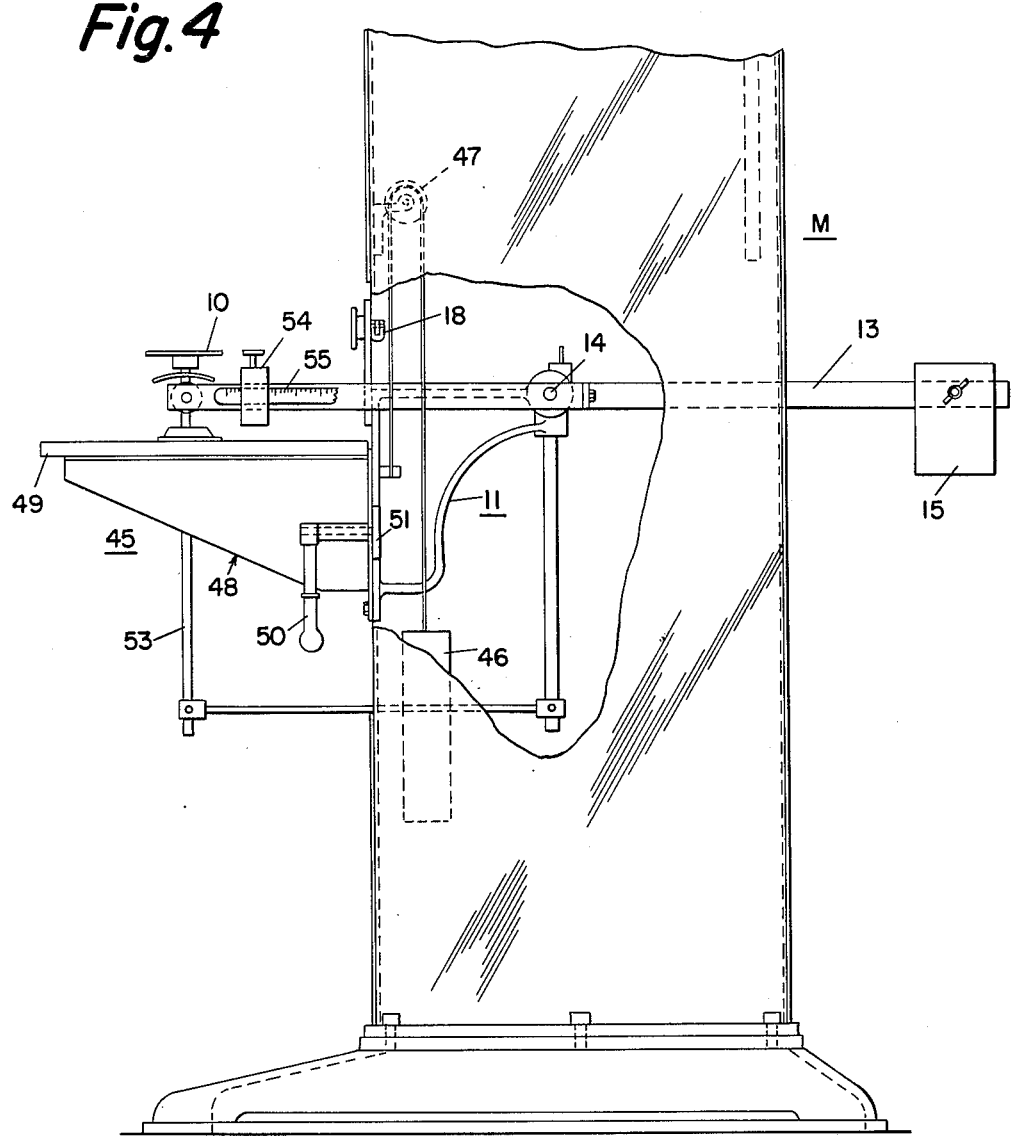
Fig. 4 is a side elevation on enlarged scale with parts broken away showing the lower portion of the machine of Fig. 1 and is a continuation of the side view shown in Fig. 3.

As shown in Fig. 4, the scale mechanism 11 and the table unit 45 of the machine filling station are adjustable vertically as a unit in order to accommodate containers of different heights without the necessity of utilizing augers of different lengths. Thus one of the advantages of this construction permits the use of augers of a uniform standard length and avoids the necessity of matching the auger length to the particular container height. By standardizing the length of auger fewer augers are required to handle a wide variety of containers and the only variations necessary in the augers are changes in pitch and diameter. The unit comprising the table 45 and the scale mechanism 11 is provided with a counterweight 46 suspended over a pair of pulleys 47, 47 (Fig. 6) the counterweight being connected at one end of its cord to the bracket 48 that supports the table board 49. When the scale mechanism and table unit has been raised or lowered to the appropriate position, the unit is locked in place by means of a table locking-lever 50. The table locking-lever 50 has integral therewith a locking cam 51 that is rotated into and out of engagement with the frame F of the machine.

Figure 6:
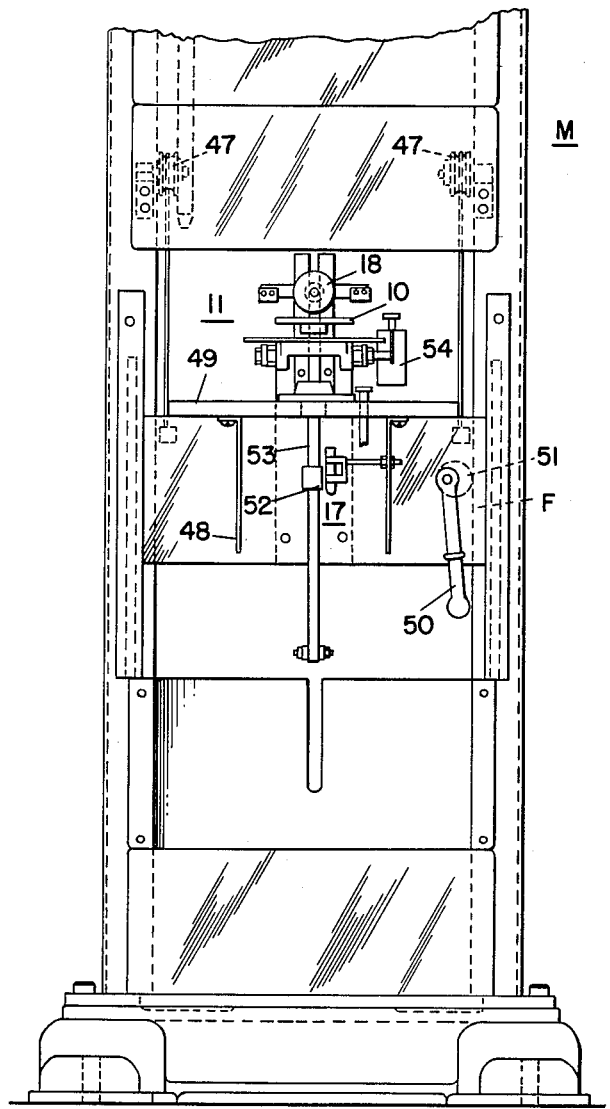
Fig. 6 is a front view on enlarged scale with parts broken away of the lower portion of the machine shown in Fig. 1 and corresponds to the lower portion shown in Fig. 4.

While the scale limit switch 17 (Fig. 2) may be of any suitable type of cut-off switch, in Fig. 6 it has been illustrated as of the mercury type utilizing a magnet 52 for interrupting the circuit, the latter being carried by and movable with the rod 53 that supports the scale pan 10 of the scale mechanism. In order to obtain fine adjustment in setting the counterweight 15 there may be provided on the opposite side of the fulcrum 14 and adjacent the scale pan 10 a poise weight 54 associated with an indicating scale 55 calibrated in suitable units, Fig. 4.

Figure 3:
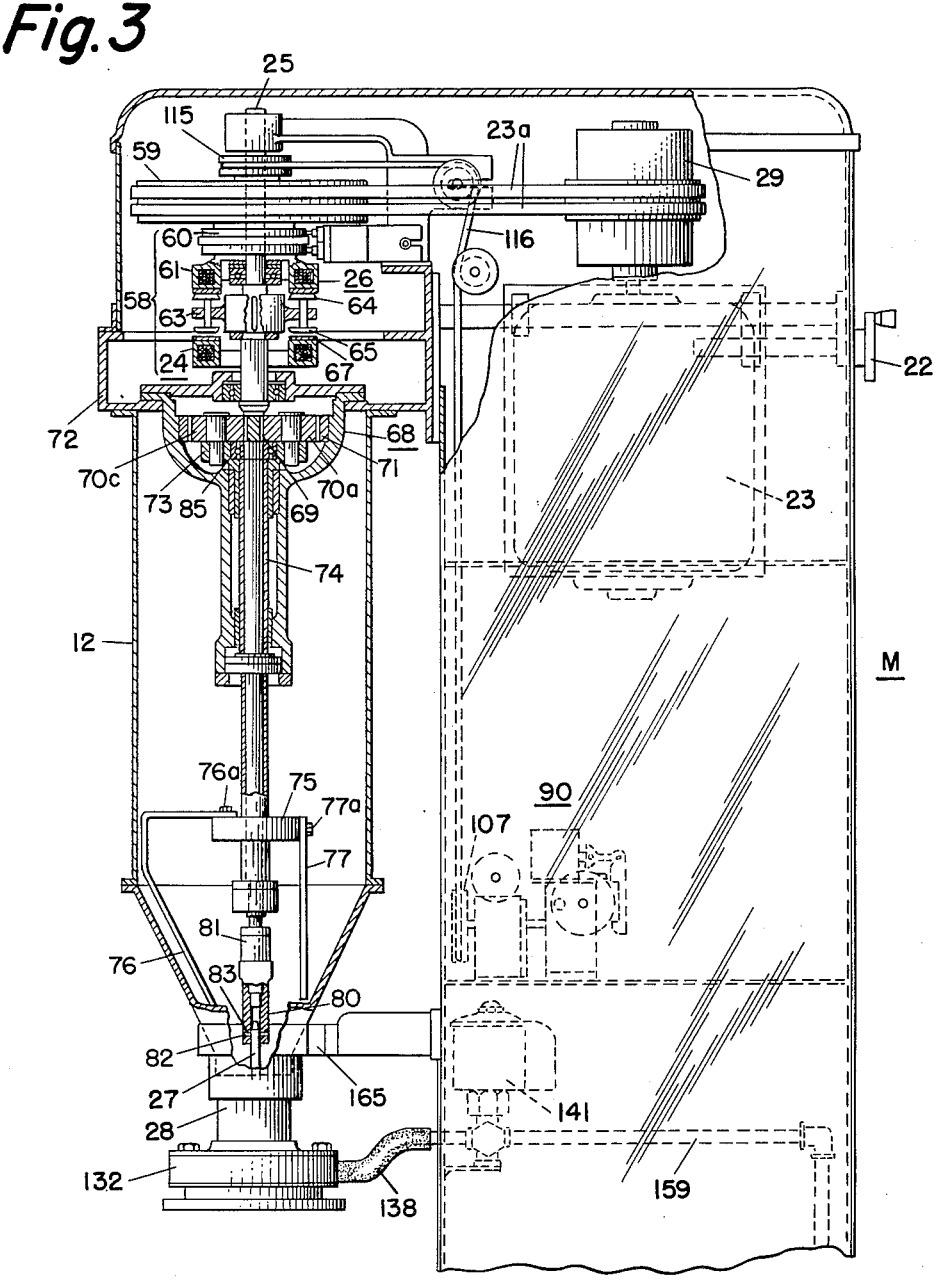
Fig. 3 is a side elevation on enlarged scale with parts broken away showing the upper part of the machine shown in Fig. 1 and including a vacuum filling head but omitting the control panel shown separately in Figs. 1A and 1B.

In Figs. 1 and 3 the drive motor 23 has been shown mounted in a vertical position adjacent the clutch-brake unit 58, including clutch 26 and brake 24, later to be described in detail. The motor 23 is provided with a shaft extension having mounted thereon a variable pitch pulley 29 which may be of any suitable type such as a spring loaded double-sheave motor pulley providing infinite speed adjustability over predetermined maximum and minimum ratios of speed variation. The motor is movable horizontally on slides by means of crank 22 thus varying the tension on the drive belts 23a and changing the spring loading of the pulley 29 resulting in a change in the pitch diameter of pulley 29 and thereby a change in the speed of the auger shaft 25. The variable pitch pulley 29, Fig. 3, is connected by means of drive belts 23a to machine pulley wheel 59 integral with the armature 60 and housing 61 of clutch 26, the pulley wheel 59 and armature 60 and housing 61 being freely rotatable as a unit on the auger shaft 25.

The clutch-brake unit 58, mounted directly on auger shaft 25, comprises clutch means 26 and brake means 24, a part of which is the clutch-brake disc unit 63, integral with shaft 25, having spaced friction surfaces 64 and 65 for alternately engaging corresponding friction surfaces 66 and 67 of the clutch means 26 and the brake means 24 depending upon which means is energized. Beneath the clutch-brake unit 58, and mounted on the same vertical axis as auger shaft 25, is a planetary gear unit 68. The gear unit 68 is adapted to drive agitator means for aiding in the feed of the material by the auger and comprises three planet gears 70a–70c equally spaced about and meshing with a sun gear 69 cut on auger shaft 25, the gears 70a–70c being disposed within and meshing with a stationary ring gear 71 shown in Figs. 3 and 3A. The gear unit 68 along with the clutch-brake unit 58 are supported above the filling station of the machine by means of a bracket 72 mounted on the frame of the filling machine.

The planetary gear unit 68 is arranged to drive the hollow shaft 74 which surrounds the auger shaft 25, the hollow shaft 74 being carried by planet arm 73 which in turn is mounted for rotation about shaft 25 on a ball bearing 85. The hollow shaft 74 serves as an agitator shaft and has clamped thereto by means of a split clamp 75 a pair of agitators 76 and 77. The agitators 76 and 77 may be connected to the clamp 75 as by screws 76a and 77a, Fig. 3. The lower end of auger shaft 25 is provided with an auger holder 80 held thereon by a locking sleeve 81. To facilitate removal of the auger 27 in order to adapt the machine for use with different materials and for a wide range of sizes of containers to be filled, the auger's connection to shaft 25 may be effected, as appears in Fig. 3, by a pin and bayonet slot connection, the pin 82 preferably being carried by the auger 27 and the bayonet slot 83 being cut in the auger holder 80.

The feed of the material into container C is effected by auger 27 which closely fits the discharge tube 28 of machine hopper 12 and rotates therein for a fraction of each cycle of the filling machine. The agitator shaft 74 is rotatable with the auger shaft 25 through the planetary gear unit 68 above described and drives the agitators 76 and 77 which are provided to facilitate proper feed of materials. The position of the agitator holder or clamp 75 on auger shaft 74 is preferably at a height wherein the straight agitator 77 extends straight down so that its bottom end is close to the flange at the bottom of the hopper 12. With agitator holder 75 in this position the bent agitator 76 should come close to the side of hopper 12 but without touching the hopper and without either of the agitators touching the auger 27.

Some containers are too small to hold the required weight of material unless the product is packed under pressure into the container. This method of filling is referred to as pack-filling. In order to accomplish the method of pack-filling, the product or material is packed into the container C against the pressure of the counterweight 15.

As shown in Fig. 1, the filling machine has been provided with a conventional funnel-type filling tube 28 and this type of filling tube or nozzle is also suitable for filling containers by the method of pack-filling. To fill containers by the method of pack-filling, the container C to be filled is placed on the scale pan 10 and the scale beam 13 is raised so that the container is placed over the end of the discharge tube 28 with the end of the tube near the bottom of the container, for example, about one-quarter inch above the bottom of the container. A container positioned for filling by the method of pack-filling has been illustrated in Fig. 1 in broken lines. This methods permits the empty containers to be filled from the bottom to the top, the material being fed into the container by the feed of auger 27 and the container descending along the discharge tube due to the pressure of the material operating against the counter pressure of the counterweight 15 at the opposite end of beam 13. The counterweight 15 is set toward the end of beam 13 if it is desired to provide a heavy pressure against the material flow or the counterweight 15 may be set forward towards the fulcrum 14 if it is desired to utilize a lighter pressure for packing the material into containers. During the filling operation the container will descend along the filling tube until the material has been packed into the container to a predetermined height. This height of material in the container will correspond to a predetermined volume and weight, the weight being governed by the density of the material.

With the scale beam 13 and container positioned, as illustrated in broken lines in Fig. 1, for pack-filling, the filling machine is operated in a manner similar to the operation described above in connection with the method of weigh-filling. More particularly, referring to Fig. 2, selector means 21 is moved into engagement with contact 21a and the line switches 20, 20 are closed thus energizing motor 23 and the coil of brake 24. Motor 23 rotates the housing of clutch 26 freely on auger shaft 25 until foot switch 30 is momentarily depressed. Upon closing foot switch 30 a circuit is completed through the normally closed contacts of cut-off switch 17 and through the coil of relay 31 thereby energizing the coil and causing normally open switches 35 and 36 to close and normally closed switch 37 to open. When normally closed switch 37 opens, the coil of brake 24 is deenergized thereby releasing the brake with respect to auger shaft 25 and upon closing of normally open switch 36 the coil of clutch 26 is energized thereby actuating the friction clutch and effecting a mechanical drive between motor 23 and auger shaft 25. Auger shaft 25 starts to rotate auger 27 feeding material into container C until the predetermined quantity has been packed into the container at which time the contacts of normally closed switch 17 are opened causing the coil of relay 31 to be deenergized and interrupting the circuit of clutch 26 and closing the circuit of brake 24. Upon the opening of the contacts of switch 36, in circuit with clutch 26, the auger shaft 25 is disconnected mechanically from the motor 23, and the brake 24, having been energized upon the closing of the contacts of switch 37, prevents further rotation of auger shaft 25. When the auger shaft 25 stops rotating, the material is at once prevented from flowing in the container.

During a pack-filling operation the container C continuously descends along the filling tube, the speed of descent depending upon the speed of fill. This is in contrast to the weigh-filling method previously described where the container does not descend until the required amount of material has been placed in the container and the container then moves to a lower position, actuating the electrical switch 17 for cutting off the operation of the auger 27.

Another method of filling containers that may be performed by the universal filling machine is the method of volume-filling. Volume-filling is perhaps the most conventional method of filling and it is particularly suited for filling operations where the material is of uniform density. In filling by volume the container is filled with material controlled by a predetermined number of revolutions of the auger. The pitch, diameter and number of revolutions of the auger determine the volume of the material to be filled into the container. The rotation of the auger is controlled by means of the clutch-brake unit 58, the latter being controlled by a timing mechanism 90 now to be described.

The timing mechanism 90 has been diagrammatically illustrated in Fig. 2 and illustrated in detail in Figs. 7–10. The timing unit 90 comprises a cam shaft 91 carrying thereon a cylindrical cam 94 having a variable operating dwell 94a in the form of a helix, a cam follower 96 that actuates a pair of limit switches 98 and 99 for controlling the clutch-brake mechanism 58, a one-revolution clutch 100 actuated by a solenoid 101, and a variable speed transmission unit 104 having a ratio range variable, for example, from about 4:1 down to about 1800:1 for varying the speed of cam shaft 91. The spiral cam 94 is fixed as by key 91a, Fig. 7, to rotatable cam shaft 91 which is supported at bearing supports 92 and 93. The cam follower 96 preferably is in the form of a roller that engages the spiral cam 94, the roller 96 being mounted on one end of a lever arm 97, Fig. 8, the opposite end of which is provided with adjustable timing screws 98a, 99a, Fig. 7, for varying the actuation of switches 98 and 99. There is also provided an adjustable stop 97a for limiting the downward movement of the end of arm 97 carrying the timing screws 98a and 99a. The spiral cam 94 may be adjusted axially of shaft 91 in order to change the time of dwell by bringing a different axial segment of cam 94 into engagement with roller 96. To move the spiral cam 94 axially of cam shaft 91, there is provided a threaded rod 105 that is supported for rotation by supports 92 and 106, the threaded rod 105 carrying a threaded member 108 adapted to engage a groove 109 at one end of spiral cam 94. As the control knob 110 fixed to rod 105 is rotated, threaded member 108 is caused to move axially of rod 105 and concurrently adjusts spiral cam 94 axially of cam shaft 91. Adjustment of control knob 110, located at the central control station 19, provides for a fine or small adjustment for governing the amount of fill.

To control the time interval between fills, there is provided a control knob 112 which is fixed to a threaded rod 113 and controls the variable speed transmission or reducer 104 which in turn controls the speed of the cam shaft 91. The threaded rod 113, Fig. 7, carries a threaded rider 114 mechanically connected to the control lever 104a of unit 104 as by link connection 111. Thus, by adjusting control knob 112 located at the control station 19, there will be obtained adjustment of control lever 104a of the variable speed reducer unit 104, thereby changing the speed of cam shaft 91. The variable speed reducer 104 is driven from a drive pulley 115 which rotates with machine pulley 59, the latter being driven from electric drive motor 23. As shown in Fig. 2, a belt 116 interconnects pulley 115 with the pulley 107 of the variable speed reducer 104. The dwell 94a on the spiral cam 94 determines the number of degrees in a cycle required for filling and the variable speed reducer unit 104 used in combination with the spiral cam 94 provides within limits an infinite range of filling speeds, that is to say, an infinite range of filling cycles.

In order to enable an operator readily to duplicate a prior setting or filling cycle, index means such as linear reference scales 117 and 117, Figs. 7 and 9, are associated with corresponding control knobs 110 and 112. These scales are visible from the central station of the machine through openings in the control panel 19 as may be seen in Figs. 1A and 1B. The reference scale 118 is mechanically connected to threaded rod 113 by member 114 and cable connection 118a. As member 114 is threadedly carried by rod 113, it will move axially of the rod 113 in response to adjustment of control knob 112 and concurrently move the corresponding reference scale 118 as an index of the adjustment of control knob 112. A similar arrangement is provided for scale 117 and knob 110, as by member 108 and cable connection 117a associated with corresponding threaded rod 105.

It is not necessary to shut down the filling machine to make any desired changes in the filling cycle as the various adjustments may be effected while the machine is in operation. For example, the speed of auger shaft 25 may be varied by adjustment of crank 22 to vary the rate of feed, or the fraction of the filling cycle during which material is being fed by the auger may be varied by adjustment of control knob 110 for engagement of a segment of spiral cam surface 94a of different angular extent with cam follower 96, or the time between fills or total filling cycle time may be varied by adjustment of control knob 112 to adjust variable speed transmission unit 104 and thus vary the speed of cam shaft 91. All of these adjustments provide an increase or decrease in the amount of filling fed to a container during a cycle of the machine; however, the latter two adjustments, i. e. adjustment of control knobs 110 and 112, change the number of revolutions of the auger per cycle of the machine without changing the rate of feed.

Operation of the filling machine by the method of volume-filling is accomplished in the following manner. Referring to Fig. 2, the selector switch 21 is moved into engagement with contact 21b and line switch 20 is moved into closed position. Thus with the control set as shown in Fig. 1A, the machine is ready for filling containers by the method of volume-filling. Upon closing line switch 20, both motor 23 and brake 24 are energized as previously described; the motor 23 is idling and the auger shaft 25 is not connected to the motor drive but instead is held stationary by brake 24. The foot switch 30 is momentarily depressed whereupon a circuit is completed through the solenoid 101 of the one-cycle clutch 100 from conductor 32 through foot switch 30 and selector switch 21 to the opposite side of the line or conductor 33. Upon energization of solenoid 101, a latch 119, Fig. 10, is released from engagement with a pivotally mounted clutch-dog or pawl 120 biased by a spring toward engagement with a continuously rotating clutch member 122 freely rotatable on cam shaft 91 and driven from the variable speed reducer 104 through bevel gears 123 and 124, Fig. 9. When dog 120 engages the continuously rotating clutch member 122, as the dog is mounted on a driven clutch member 126 which is fixed to cam shaft 91, the latter will be rotated through one revolution at a speed controlled by the variable speed reducer 104. At the end of the cycle, that is one revolution of shaft 91, the pawl 120 reengages the latch 119, which in the meantime has resumed its original position, and by it is moved, in opposition to spring 121, out of engagement with the driving clutch member 122.

Upon energization of solenoid 101, initiating operation of the one-cycle clutch 100 as previously described, cam shaft 91 is caused to rotate thereby rotating spiral cam 94. Upon rotation of cam 94 the cam follower 96 engages the dwell 94a of cam 94 and actuates limit switches 98 and 99. Limit switch 98 is connected in series with the coil of brake 24, Fig. 2, and is moved from its normally closed position to open position thereby deenergizing the coil of brake 24 and releasing auger shaft 25 for rotation. Limit switch 99 is normally open and is in series circuit with clutch 26 so when it is moved to closed position by cam follower 96, the coil of clutch 26 is energized thereby mechanically connecting auger shaft 25 with drive motor 23 to effect rotation of the shaft and initiate filling of the container. As may be seen in Fig. 2, the circuit for the clutch 26 may be traced from conductor 40 through a shunting switch 130 through limit switch 99 and the coil of clutch 26 to conductor 41. The circuit for the brake may be traced from the conductor 40 through switches 37 and 98 and the coil of brake 24 to conductor 41.

Switch 99 is held in its closed position and switch 98 is held in its open position only as long as cam follower 96 engages the dwell 94a on spiral cam 94 and it is only during this portion or fraction of the filling cycle that the auger shaft 25 is rotated and material is fed into the container. As described above, the time of dwell, that is the filling time, may be varied by adjustment of spiral cam 94 axially of shaft 91. After the dwell 94a on cam 94 has been rotated out of engagement with cam follower 96, limit switches 98 and 99 will be returned to their normally closed and normally opened positions respectively, thus reconnecting brake 24 with auger shaft 25 to prevent further rotation thereof and disconnecting drive motor 23 from shaft 25. In the operation of the timing mechanism 90 it is preferable that the limit switch 98 in circuit with the brake 24 be closed concurrently with, or a little ahead of, the opening of limit switch 99 which is in circuit with the magnetic clutch 26. This sequence of operation of limit switches 98 and 99 insures that the number of revolutions of the auger 27 will be accurately controlled. If the clutch 26 were disengaged first, there would be some continued revolution of the auger due to the momentum of the parts. As the continued revolution from one container to another might not be constant, the required repetitive accuracy in filling would not be assured. Thus the brake should be applied to the auger shaft at least as soon as the disengagement of the clutch in order to overcome any possible error that would give rise to filling variations.

In comparing the above-described methods of weigh-filling, pack-filling and volume-filling, it may be said that weigh-filling is generally preferred to pack-filling when the size of the container permits, that is, when the container is large enough so that it will hold the required amount of material without packing and the bulk of the material is too large, for example weights in the order of ten to fifteen pounds or greater, to be accurately filled by the conventional volume-filling method. Weigh-filling is also preferable to volume-filling when the material being handled is relatively expensive and in such cases it is more desirable to have an accurate weight than a particular volume. The method of weigh-filling is also preferred on material where its density is subject to variation. Examples of such materials are the various insecticides.

The method of vacuum-filling will now be described. In filling a container by the method of vacuum-filling it is necessary to exhaust the air from the container. Accordingly, there has been illustrated in Fig. 11 and in broken lines in Fig. 2, a vacuum-filling head 132 that is attached to the discharge tube 28. The container C is to be sealed against a gasket 133 during the filling operation thus sealing the interior of the container from the atmosphere.

The vacuum-filling head may be of any of the types disclosed in the aforesaid Bleam Patent No. 2,330,862 as the present filling machine is applicable to vacuum-filling both flexible wall and rigid wall containers.

As may be seen in Fig. 11, the vacuum head 132 is adapted for filling rigid wall containers and the gasket 133 is carried by a clamp ring 134 that is clamped about the lower end of vacuum head 132. Within the inner diameter of the annular gasket 133, the vacuum head is provided with an annular screen 135 that surrounds the discharge opening from filling tube 28. The interior of the vacuum head 132 is provided with a flow passage 137 extending around the bore of filling tube 28 adjacent screen 135. A hose 138 is connected to flow passage 137 for selectively applying suction or pressure to the interior of the container C as later to be described in detail. After the air is exhausted from the inside of the container, the material is forced into the container by a combination of the rotation of the auger 27 and the atmospheric pressure in the hopper 12. At the end of the filling cycle, the vacuum-filling head 132 is opened to atmosphere and the operations of cleaning the screen and packing the material into the container are performed under atmospheric pressure as more fully described in aforesaid Bleam Patent No. 2,330,862.

Figure 5:
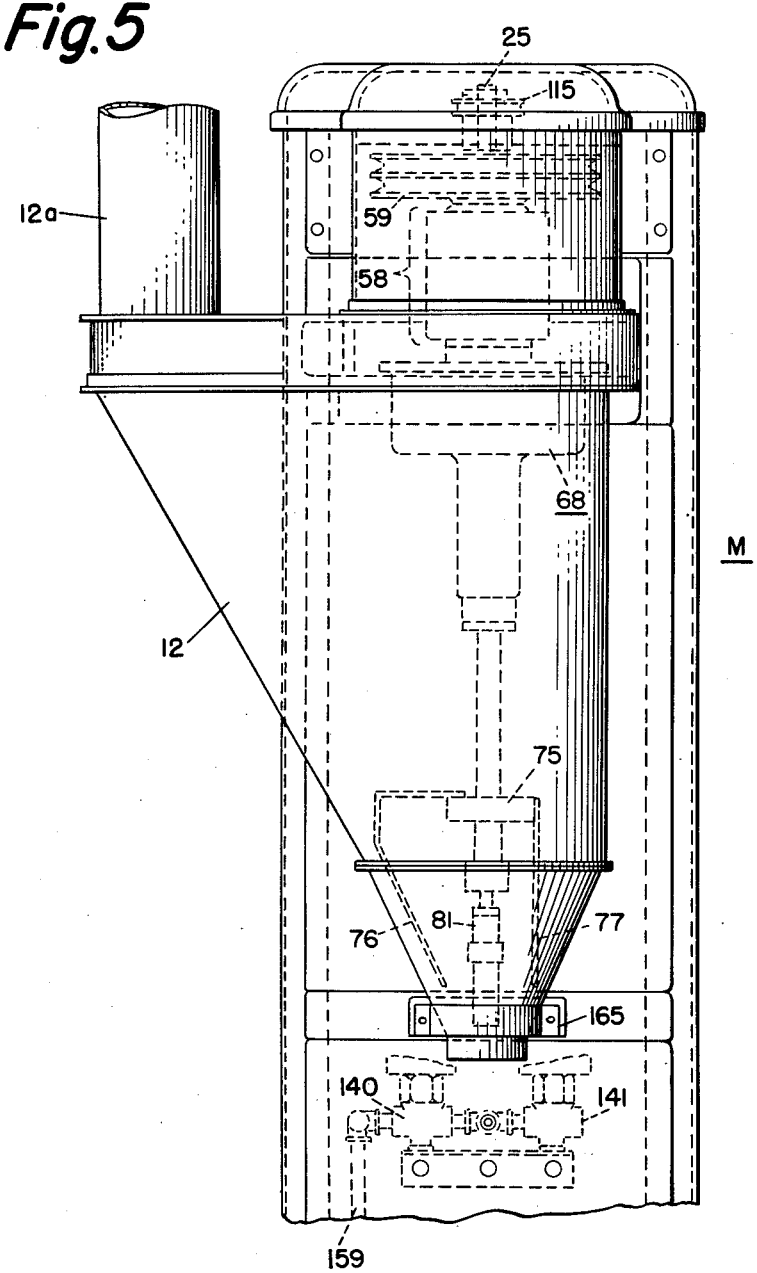
Fig. 5 is a front view on enlarged scale of the upper portion of the machine shown in Fig. 1 with parts broken away or omitted and corresponds to the upper portion shown in Fig. 3.

In performing a vacuum-filling operation in addition to the aforementioned equipment utilized in volume-filling, there are provided a vacuum valve unit 140 and an atmosphere valve unit 141, Figs. 2 and 5. To control the operation of these two valve units, there are provided a pair of cams 142 and 143 on an extension of cam shaft 91 which carries the spiral cam 94, Fig. 7. The valve units 140 and 141 have been illustrated as solenoid-operated, the solenoids being energized through switches 144 and 145, switch 144 being operated by cam 142 and switch 145 being operated by cam 143. Cam shaft 91 is provided with an additional cam 147 for operating a normally open switch 148 that is in series with switch 99, Fig. 2, the latter previously being described as in series with the coil of magnetic clutch 26. As may be seen in Fig. 2, switch 130 mentioned above in connection with volume-filling is in shunting relation with respect to switch 148. The cams 147, 142 and 143 and corresponding switches 148, 144 and 145 of Fig. 7 have been omitted in Fig. 9; however, the extension of shaft 91 has been shown.

In operating the system for vacuum-filling, the selected switch 21 is moved into engagement with contact 21b, Fig. 2, and normally open switch 150 is moved to closed position as shown in Fig. 1B. As may be seen in Fig. 2, switch 150 has been illustrated as mechanically connected, by broken line 151, with normally closed shunting switch 130 and thus when switch 150 is closed, switch 130 will be concurrently opened. The line switch 20 is then closed thus energizing motor 23 which runs in unload condition and the brake 24 is energized through the normally closed switches 37 and 98. To initiate the filling cycle, foot switch 30 is momentarily depressed thereby energizing solenoid 101 of one-revolution clutch 100 and causing rotation of cam shaft 91 in the same manner as described above in connection with the method of volume-filling. Upon rotation of spiral cam 94 and engagement of cam follower 96 with dwell 94a, limit switches 98 and 99 are actuated opening the circuit of brake 24 and closing switch 99 in circuit with clutch 26. However, the closing of switch 99 has no effect on clutch 26 at this time since switch 148 which is in series with switch 99 and no longer is shunted by switch 130 is open and thus the circuit through the clutch 26 is not completed. Upon continued rotation of cam shaft 91 and spiral cam 94, cam 142 which is carried by cam shaft 91 continues to rotate and closes normally open switch 144 thereby completing the circuit to the solenoid of vacuum valve unit 140. When switch 144 is closed, the interior of the container is connected to vacuum through hose connection 138 for a filling operation. Upon further rotation of cam shaft 91, the cam 147, which has a predetermined angular setting with respect to cams 142 and 143 on shaft 91, effects closing of the normally open contacts of switch 148 thereby completing a circuit through switch 99 to clutch 26 and thus mechanically connecting the auger shaft 25 to the drive motor 23.

By varying the angular position of cam 147 with respect to cams 142 and 143 a variation in the length of time the auger rotates during the vacuum cycle may be effected. This has the advantage of using the auger as a brake against flow of material when the container is initially evacuated.

The rotation of the auger 27 assists in the filling operation by regulating the flow of the material caused by the differential in pressure due to the vacuum in the container C and the atmospheric pressure in hopper 12. Near the end of the one cycle or one revolution of cam shaft 91, the cam follower 96 moves off of dwell 94a thus causing switch 98 in series with brake 24 to be closed and stopping further revolution of the auger 27. Switch 99 is then opened breaking the circuit to clutch 26 and disconnecting the drive motor 23 with respect to auger shaft 25. The cam 142 causes switch 144 to open thus closing the valve of vacuum unit 140 and this operation is followed by cam 143 moving switch 145 to closed position for opening the valve of atomsphere valve unit 141 and applying atmospheric pressure to hose 138. Thus the interior of the container C is again connected to atmosphere and the filling operation is completed. After the interior of the container C is subjected to atmosphere at the end of the filling operation, switch 145 is opened by cam 143 thus closing the atmosphere valve 141 so that the subsequent filling cycle will be started with the atmosphere valve in closed position.

The source of vacuum applied to unit 140 has been illustrated in Fig. 1 as being derived from a suitable system such as a system including a suction pump 155 driven by a motor 156, the suction being applied to valve unit 140 by way of filter 157, tank 158 and flow connection 159.

From the foregoing description it will be seen that various adjustments may be made of the filling machine in addition to selecting the particular method of filling. For example, the speed of rotation of auger shaft 25 may be controlled by adjustment of the variable pitch pulley 29 driven by motor 23. In addition to this adjustment when filling by either the method of volume-filling or vacuum-filling, an infinite range of filling speeds or filling cycles may be obtained through adjustment of knobs 110 and 112. The dwell 94a on the spiral cam 94 determines the number of degrees in a cycle required for filling and this is adjusted by means of knob 110. The variable speed reducer 104, adjusted by knob 112, is driven from pulley 115 which in turn is driven by motor 23 and adjustment of knob 112 controls the speed of rotation of cam shaft 91 during each operation of the one-cycle clutch 100. Thus knob 110 may be considered as a "fine" adjustment of the timing mechanism 90 as it determines the number of degrees of the dwell 94a to be utilized during a filling cycle, and knob 112 may be considered as a "coarse" adjustment of the timing mechanism 90 as it controls the speed of rotation of the cam 94 which has the effect of varying the time of dwell but to a coarser degree.

While the straight filling tube 28 illustrated in Figs. 1 and 2 is adaptable for filling containers by any of the methods of weigh-filling, pack-filling or volume-filling, and the vacuum head attachment 132 illustrated in Figs. 2, 3 and 11 is suited for vacuum-filling, other types of filling heads may also be used with the machine. As may be seen in Figs. 3 and 11, the filling heads may be disconnected as a unit from the machine hopper 12. The filling head assemblies at their upper ends are provided with a funnel member 162, Fig. 11, having a pair of thumb screws 163 threadedly received therein and adapted to be received in a bayonet slot cut in a pair of lugs 164 supported from a bracket or support 165, Fig. 3, at the lower end of the machine hopper 12. The filling head 132 of Fig. 3 has been omitted in Fig. 5.

By loosening the thumb screws 163 the filling head assemblies as shown in Figs. 3 and 11 may readily be removed from the lower end of the hopper and another filling head assembly placed thereon, such for example as any of the filling head assemblies illustrated in Figs. 12–15. The filling head assembly shown in Fig. 12 is particularly adaptable for filling a container with fine crystals as the material will be thrown from the spinning plate 167 attached to the bottom of auger 27a. To assist in guiding the material into the container, there is provided a funnel-shaped guard 168 that is supported from the funnel member 162 and surrounds the plate 167. The container $C_1$ in this instance has been illustrated as a bag and it is held in open position by means of a bag holder 170. The filling head assembly of Fig. 12 is particularly suited for weigh-filling operations wherein the quantities of material to be placed in the containers range from about two to fifteen pounds.

In Fig. 13 the filling head assembly utilizes a conventional straight filling tube 28. However, surrounding the lower end of the tube there is a gasket 172 carried by clamp 173 and adapted to be registered against the top of the rigid wall container $C_2$ illustrated therein. This arrangement is particularly suited for filling containers from the top by the method of volume-filling.

Figure 14:
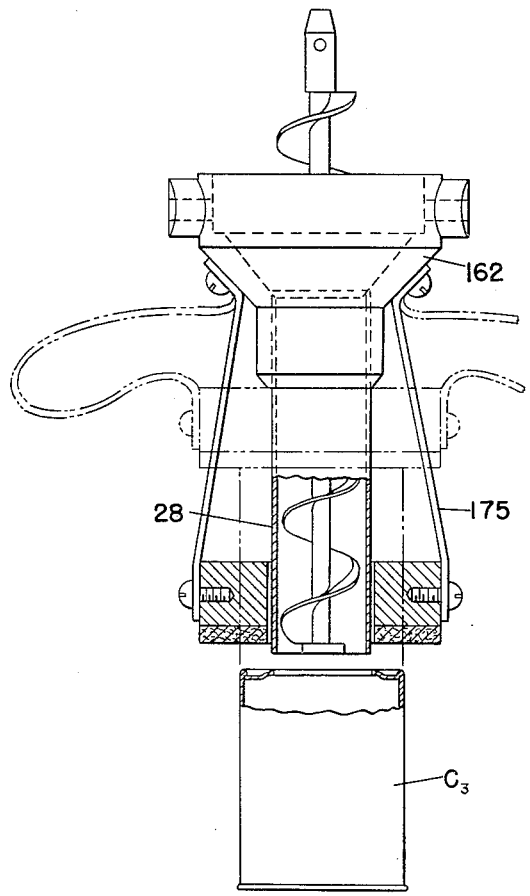
Figure 15:
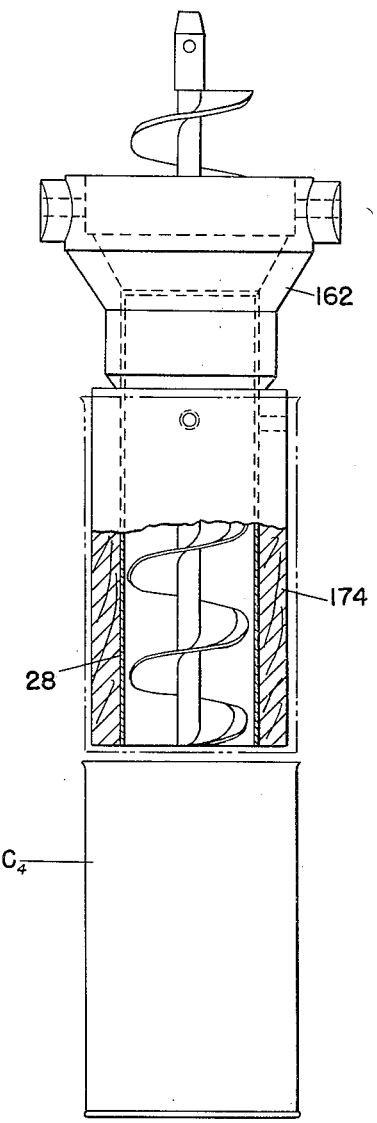

In Figs. 14 and 15 the filling head assemblies also include the straight discharge tube 28 of Figs. 1–3, 11 and 13 but in addition there has been provided a form 174, Fig. 15, and a follower 175, Fig. 14, both of which, whether used separately or together, are particularly suited for filling containers such as $C_3$ and $C_4$ by the method of pack-filling, that is, packing the container from the bottom against pressure.

Having described the present machine in detail, it will be seen that it has numerous advantages over the prior art machines as exemplified by the aforesaid Bleam patent. The present machine has approximately 40% less working parts than the aforesaid Bleam machine, and the change-over time on the present machine from one type or method of filling to another has been decreased to a minimum with the change-over being accomplished by finger-tip control from the central control panel, thus eliminating the need of a set-up man. As the present machine has provision for a wide range of filling cycles, it is possible to use the same auger and filling head for pack-filling, weigh-filling and volume-filling, whereas on the aforesaid Bleam machine this was not possible due to the limited filling cycle time of the machine. To correct for variations in weight on the present machine a change in dial setting can be made by the operator from the control station, whereas on the Bleam machine a large correction in weight necessitated stopping the machine and adjusting a cam with a wrench or replacing the cam with a larger or smaller cam.

Due to the inclusion in the present machine of the variable-speed drive unit 104 the time interval between filling operations can be varied to suit the operator. For example, in filling small containers the containers become filled within a relatively short time, and thus there would be a relatively long inactive period while waiting for the filling cycle to be repeated. However, on the present machine the operator can decrease the length of the inactive period by varying the coarse-setting knob 112 and thus speed up production and fill more containers within a given time than on machines with fixed cycle time. It will be noted that to obtain the continuous operation discussed above, it will be necessary to hold the foot pedal 30 in a depressed position rather than to depress it momentarily as is the case when only a single container is to be filled or when a relatively long interval of time is to be allowed between the filling of containers.

A further advantage in the construction of the present machine is the provision of the agitator drive located concentrically of the auger drive. With this arrangement, agitator shaft 74 may be driven by planetary gears and thus provides for quieter and more efficient operation and a more compact unit. By locating the clutch 26 concentrically with and directly on the auger shaft 25 there has been eliminated the need of a gear train such as utilized in the aforesaid Bleam patent and which, due to normal backlash in gears, causes inaccuracies in shaft revolutions during the filling operations. Direct control on the auger shaft as in the present machine results in more accurate filling operations and minimizes inertia problems.

While a preferred embodiment of this invention has been described and illustrated, it shall be understood the invention is not limited to the specific arrangements

What is claimed is:

1. A filling machine suited for filling containers by pack-filling, weigh-filling, volume-filling, or vacuum-filling, comprising means for pack-filling containers, means for weigh-filling containers, means for volume-filling containers, means for vacuum-filling containers, all of said means comprising a plurality of components and having common thereto a group of components including a drive motor, an auger operable by said motor to feed material into a container, clutch means for operatively connecting and disconnecting said motor with said auger, and brake means for selectively preventing rotation of said auger by said motor, and selective means set by an operator for operatively connecting said group of common components and the other components of one of said means for filling containers in accordance with the means of filling selected by the operator and for automatically rendering inoperative the other components utilized in the non-selected filling means.

2. A filling machine according to claim 1 wherein both said clutch and brake means are electrically operated and said means for weigh-filling and pack-filling containers includes a beam scale adapted to have a container positioned thereon beneath the auger, a normally closed switch having contacts movable with movement of said beam scale, a relay in series with said normally closed switch, said relay having a plurality of sets of contacts, one set of said contacts being normally open and in series with said clutch means, another set of said contacts being normally closed and in series with said brake means, and a third set of contacts being normally open and in series with said normally closed switch, means for applying power to said relay for closing said normally open contacts and opening said normally closed contacts to deenergize said brake means and energize said clutch means to initiate the feeding of material by said auger into the container, and said normally closed switch having contacts associated with said beam scale being moved to open position upon receipt of a predetermined quantity of material in the container, thereby interrupting the circuit through said relay and closing the circuit through said brake means and opening the circuit through said clutch means to stop the feeding of material into the container.

3. A filling machine according to claim 1 wherein said auger is operable during a fraction of a cycle of the machine and including variable timing means for changing the duration of the cycle without changing the magnitude of the fraction of the cycle during which said auger is operable.

4. A filling machine according to claim 3 wherein said variable timing means comprises an electromechanical device including control means for coarse and fine adjustment, said selective means comprises electrical switching means, and both said variable timing means and said selective means are operable from a central control station.

5. A filling machine according to claim 3 wherein both said clutch and brake means are electrically operated, and contact means in circuit with said clutch means and said brake means actuated by said variable timing means for selectively opening and closing the electric circuits of said brake means and said clutch means.

6. A filling machine of the type for feeding a charge of material from a hopper into a container by means of an auger comprising an auger shaft, an electromagnetic clutch-brake unit mounted axially on said auger shaft directly to control the rotation of said shaft, means for rotating said auger shaft, a hollow shaft mounted concentrically of said auger shaft, a planetary gear unit mounted axially of said auger shaft and forming a gear connection between said auger shaft and said hollow shaft, agitator means carried by said hollow shaft for loosening the material in the hopper during the feeding of a charge by said auger shaft, and electrical circuit means for selectively energizing said clutch-brake unit in predetermined sequence whereby said brake is applied to said auger shaft at least as soon as the disengagement of said clutch to terminate each filling cycle and prevent uncontrolled filling variations in the filling cycles.

7. A filling machine of the type for feeding a charge of material from a hopper into a container by means of an auger comprising an auger shaft for carrying an auger, a motor for driving said auger shaft to feed material into a container, an electromagnetic clutch for operatively connecting and disconnecting said motor with said auger shaft, an electromagnetic brake for selectively preventing rotation of said auger shaft by said motor, said clutch and said brake being mounted on said auger shaft and above the filling station of the machine, a scale for supporting a container beneath said auger, a normally closed switch having its movable contacts actuated by movement of said scale, a relay in series with said normally closed switch, said relay having a plurality of sets of contacts, one set of said contacts being normally open and in series with said clutch, another set of said contacts being normally closed and in series with said brake, a third set of said contacts being normally open and in series with said normally closed switch, means for applying power to said relay for closing said one set of normally open contacts and opening said other set of normally closed contacts to deenergize said brake and energize said clutch to initiate the feeding of material by said auger into the container, and the movable contacts of said normally closed switch which are actuated by said scale being moved to open position upon receipt of a predetermined quantity of material in the container supported on the scale, thereby interrupting the circuit through said relay and closing the circuit through said brake and opening the circuit through said clutch to stop the feeding of material into the container.

8. A filling machine of the type for feeding a charge of material from a hopper into a container by means of an auger comprising an auger shaft, an electromagnetic clutch-brake unit mounted axially on said auger shaft directly to control the rotation of said shaft, means for rotating said auger shaft, a hollow shaft mounted concentrically of said auger shaft, a planetary gear unit mounted axially of said auger shaft and forming a gear connection between said auger shaft and said hollow shaft, agitator means carried by said hollow shaft for loosening the material in the hopper during the feeding of a charge by said auger shaft, and electric switching means in circuit with said electromagnetic clutch-brake unit and operable in predetermined sequence accurately to control said clutch-brake unit in its control of the rotation of said auger shaft for limiting the charge of material to be fed into the container to a predetermined quantity.

9. A filling machine comprising an auger operable in each filling cycle of the machine for feeding material into a container, adjustable means for varying the rate of feed of material by said auger, rotatable means for controlling the total duration of the filling cycle, adjustable means for conditioning said rotatable means to vary the fraction of the filling cycle during which material is being fed by said auger, and adjustable means for conditioning said rotatable means to vary the time between fills, all of said adjustable means being adjustable during the operation of the filling machine.

10. A filling machine comprising an auger operable in each filling cycle of the machine for feeding material into a container, rotatable means operable through 360° rotation for initiating and terminating each filling cycle, adjustable means for conditioning said rotatable means to vary the fraction of the filling cycle during which material is being fed by said auger, and adjustable means for conditioning said rotatable means to vary the total filling cycle time, all of said adjustable means being adjustable during the operation of the filling machine and without varying the rate of feed of material by said auger.

11. A filling machine of the type for filling a container by the method of volume-filling comprising an auger for feeding material into a container, a source of power, a clutch between said auger and said source of power, timing mechanism comprising adjustable means for controlling said clutch to vary the fraction of the filling cycle during which material is being fed by said auger, and adjustable means selectively operable during the filling cycle for varying the time duration of said fraction of the filling cycle and for varying the time between fills, both of said adjustable means being adjustable during the operation of the filling machine to provide "fine" and "coarse" adjustment of said timing mechanism.

12. A filling machine operable over a predetermined range of filling cycles comprising an auger operable in each filling cycle of the machine for feeding material into a container, timing mechanism comprising adjustable means for varying the fraction of the filling cycle during which material is being fed by said auger, adjustable means selectively operable during the filling cycle for varying the time duration of said fraction of the filling cycle and for varying the time between fills, both of said adjustable means being adjustable during the operation of the filling machine to provide "fine" and "coarse" adjustment of said timing mechanism, and index means associated with each of said adjustable means permitting the ready duplication of any filling cycle within the predetermined range.

13. A filling machine for filling containers and operable over a predetermined range of filling cycles comprising a central control station, an auger operable in each filling cycle of the machine for feeding material into a container, timing mechanism comprising adjustable means operable from said control station for varying the fraction of the filling cycle during which material is being fed by said auger, adjustable means selectively operable from said control station during the filling cycle for varying the time duration of said fraction of the filling cycle and for varying the time between fills, said adjustable means respectively providing "fine" and "coarse" adjustment of said timing mechanism, and index means at said control station associated with each of said adjustable means permitting the ready duplication of any filling cycle within the predetermined range.

14. A filling machine comprising an auger shaft having an auger for feeding material into a container, a source of power, a clutch mounted on said auger shaft and mechanically connected to said source of power, a brake mounted on said auger shaft, a timing mechanism for selectively operating said clutch and said brake, said timing mechanism comprising a rotatable cam shaft, a cam carried by said cam shaft and having thereon a dwell of variable angular extent, a cam follower for engaging said dwell, a one-cycle clutch and a variable-speed transmission in series between said cam shaft and said source of power for cyclically rotating said cam shaft to provide "coarse" adjustment of said timing mechanism, means operable by cooperation of said cam and said cam follower for operatively connecting and disconnecting said source of power with said auger through said clutch and for selectively preventing rotation of said auger by said brake, and said cam and said cam follower being arranged for relative axial movement therebetween for engagement of said cam follower with a segment of said cam of different angular extent to vary the fraction of the filling cycle during which material is being fed by said auger into the container to provide "fine" adjustment of said timing mechanism.

15. A filling machine according to claim 14 including means for filling containers by the method of vacuum filling comprising a vacuum-filling head for surrounding said auger and forming a seal with the mouth of the container to isolate the interior thereof from atmosphere during filling, means for supplying vacuum to said filling head and to the interior of the container, valve means for controlling the supply of vacuum to said filling head, valve means for controlling the application of pressure to said filling head, switch means in circuit with said vacuum valve means, switch means in circuit with said pressure valve means, rotatable control structure carried by said cam shaft for selectively operating both of said switch means to apply vacuum or pressure to the interior of said filling head in predetermined sequence, switch means in circuit with said clutch, and rotatable control structure carried by said cam shaft for opening and closing said last-named switch means, the angular position of said last-named rotatable control structure being variable with respect to the other said rotatable control structure to vary the length of time the auger rotates during the application of vacuum to a container for utilizing the auger as a brake against the flow of material when a container is initially evacuated.

16. A filling machine of the type for filling containers by the method of volume-filling comprising an auger shaft having an auger for feeding material into a container, a source of power, an electromagnetic clutch mounted on said auger shaft and operable by said source of power, an electromagnetic brake mounted on said auger shaft, a timing mechanism for selectively operating said clutch and said brake, said timing mechanism comprising a rotatable cam shaft, a spiral cam carried by said cam shaft and having thereon a dwell of variable angular extent substantially in the form of a helix, a cam follower for engaging said dwell, a one-cycle clutch and a variable-speed transmission in series between said cam shaft and said source of power for cyclically rotating said cam shaft to provide "coarse" adjustment of said mechanism, normally open switch means in circuit with said clutch, normally closed switch means in circuit with said brake, both said switch means being operable in predetermined sequence by cooperation of said spiral cam and said cam follower for operatively connecting and disconnecting said source of power with said auger through said clutch and for selectively preventing rotation of said auger by said brake, and means for providing relative movement axially between said spiral cam and said cam follower for engagement of said cam follower with a segment of said spiral cam of different angular extent to vary the fraction of the filling cycle during which material is being fed by said auger into the container to provide "fine" adjustment of the said timing mechanism.

17. A filling machine system including components selectively operable for filling containers by weight or by volume comprising an auger for feeding material into a container, a source of power, a clutch between said auger and said source of power, first means for controlling the operation of said clutch and the rotation of said auger to determine the weight of material to be fed into a container, second means for controlling the operation of said clutch and the rotation of said auger to determine the volume of material to be fed into a container, and selective means for connecting one of said first and second means in said filling machine system and disconnecting the other of said first and second means with respect to said filling system.

18. A filling machine system including components selectively operable for filling containers by weight or by volume comprising an auger for feeding material into a container, a source of power, a clutch between said auger and said source of power, a brake for selectively preventing rotation of said auger, first means for controlling the operation of said brake and said clutch and the rotation of said auger to determine by weight the material to be fed into a container, second means for controlling the operation of said brake and said clutch and the rotation of said auger to determine by volume the material to be fed into a container, and selective means for rendering operable in said filling machine system one of said first and second means and for temporarily disabling the other of said first and second means in said filling system.

19. A filling machine suited for filling containers by pack-filling, weigh-filling, volume-filling, or vacuum-filling comprising means for pack-filling containers, means for weigh-filling containers, means for volume-filling containers, means for vacuum-filling containers, all of said means comprising a plurality of components and having common thereto a group of components including a drive motor, an auger operable by said motor to feed material into a container, clutch means for operatively connecting and disconnecting said motor with said auger, and brake means for selectively preventing rotation of said auger by said motor, common means for initiating each filling cycle of said machine, and selective means set by an operator for controlling said group of common components and automatically terminating each filling cycle in accordance with the method of filling selected by the operator.

20. A filling machine suited for filling containers by pack-filling, weigh-filling, volume-filling, or vacuum-filling, comprising means for pack-filling containers, means for weigh-filling containers, means for volume-filling containers, means for vacuum-filling containers, all of said means comprising a plurality of components and having common thereto a group of components including an electric drive motor, an auger operable by said motor to feed material into a container, electromagnetic clutch means for operatively connecting and disconnecting said motor with said auger and electromagnetic brake means for selectively preventing rotation of said auger by said motor, said auger and said clutch means and said brake means all being mounted on a common vertical axis above the filling station of the machine, common means for initiating each filling cycle of said machine, and selective means set by an operator for controlling said group of common components and automatically terminating each filling cycle in accordance with the type of filling selected by the operator.

21. A filling machine suited for filling containers by weigh-filling and vacuum-filling comprising means for weigh-filling containers, means for vacuum-filling containers, both of said means comprising a plurality of components and having common thereto a group of components including a drive motor, an auger operable by said motor to feed material into a container, clutch means for operatively connecting and disconnecting said motor with said auger, and brake means for selectively preventing rotation of said auger by said motor, common means for initiating each filling cycle of said macihne, and selective means set by an operator for controlling said group of common components and automatically terminating each filling cycle in accordance with the method of filling selected by the operator.

22. A filling machine suited for filling containers by volume-filling and vacuum-filling, comprising means for volume-filling containers, means for vacuum-filling containers, both of said means comprising a plurality of components and having common thereto a group of components including an electric drive motor, an auger operable by said motor to feed material into a container, electromagnetic clutch means for operatively connecting and disconnecting said motor with said auger and electromagnetic brake means for selectively preventing rotation of said auger by said motor, said auger and said clutch means and said brake means all being mounted on a common vertical axis above the filling station of the machine, common means for initiating each filling cycle of said machine and selective means set by an operator for controlling said group of common components and automatically terminating each filling cycle in accordance with the type of filling selected by the operator.

References Cited in the file of this patent

UNITED STATES PATENTS

| | | |
|---|---|---|
| 729,007 | Stubbs et al. | May 26, 1903 |
| 1,029,669 | Converse | June 18, 1912 |
| 2,058,775 | Cundall | Oct. 27, 1936 |
| 2,330,862 | Bleam | Oct. 5, 1943 |
| 2,443,182 | Carter | June 15, 1948 |
| 2,532,913 | Higginbottom | Dec. 5, 1950 |
| 2,601,454 | Peone | June 24, 1952 |
| 2,643,026 | Craig et al. | June 23, 1953 |